United States Patent [19]
Schmidt et al.

[11] B 3,924,357
[45] Dec. 9, 1975

[54] DEVICE FOR DEBURRING WORK PIECES

[75] Inventors: Jürgen Schmidt, Herborn; Jürgen Hesse, Dusseldorf, both of Germany

[73] Assignee: Messer Griesheim GmbH, Germany

[22] Filed: Dec. 4, 1972

[21] Appl. No.: 311,910

[44] Published under the Trial Voluntary Protest Program on January 28, 1975 as document no. B 311,910.

[30] Foreign Application Priority Data
Dec. 2, 1971 Germany............................ 2159838

[52] U.S. Cl. ............................ 51/13; 51/15; 51/314
[51] Int. Cl.² ............................................ B24C 3/30
[58] Field of Search ............ 51/9, 13, 15, 163, 164, 51/314; 241/65, 172, 176

[56] References Cited
UNITED STATES PATENTS

| | | | |
|---|---|---|---|
| 1,423,128 | 7/1922 | Liedtke.................................. | 51/15 |
| 2,299,020 | 10/1942 | Jones.................................... | 51/164 |
| 2,330,949 | 10/1943 | Braun.................................... | 51/13 |
| 3,435,565 | 4/1969 | Blundell............................ | 51/163 X |
| 3,445,966 | 5/1969 | Moore..................................... | 51/9 |

FOREIGN PATENTS OR APPLICATIONS
808,521 2/1959 United Kingdom................... 51/164

*Primary Examiner*—Al Lawrence Smith
*Assistant Examiner*—Robert C. Watson
*Attorney, Agent, or Firm*—Connolly and Hutz

[57] ABSTRACT

Device for deburring work pieces of rubber and similar material comprises essentially closed container for receiving work pieces with supplies of low-temperature medium and blasting agent connected to container by conduits. Container includes lower trough section rotatable about vertical axis, and centrifugal wheel in lower trough section is constructed and arranged to introduce blasting agent into that section onto work pieces for deburring them.

4 Claims, 2 Drawing Figures

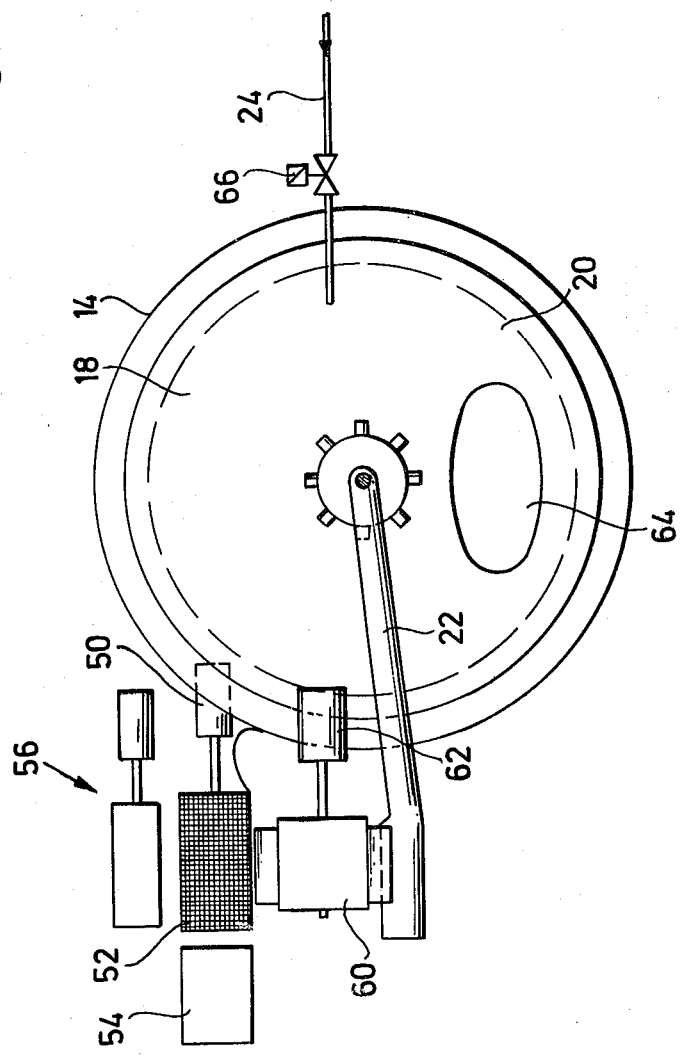

DEVICE FOR DEBURRING WORK PIECES

BACKGROUND OF THE INVENTION

The present invention relates to a device for deburring work pieces of rubber or similar material capable of becoming brittle. Essentially, the device consists of a closed container for receiving the work pieces, and conduits are connected to the container for conducting a low-temperature medium and a blasting agent thereto.

Already known is a device, such as described in German Pat. No. 1,207,616, consisting of two opposing and vertical disks with an endless caterpillar band arranged between them along a part of the disk circumference. The work pieces to be deburred are conveyed upwardly by the caterpillar band and fall back again on the band by gravity. The work pieces hit each other and due to their brittleness which is brought about by a coolant sprayed on the caterpillar band, the rims and work piece edges are deburred. In the known device, a blasting agent is directed against the work pieces by means of a blower or centrifuging wheel to increase the deburring effect. In the known device, the caterpillar band is subjected to rapid and excessive abrasion.

SUMMARY OF THE INVENTION

It is an object of the present invention to provide a deburring device which is simple in construction and which affords optimum deburring with reference to the quality and quantity of the work pieces being operated upon.

For the solution of the problem, it is proposed, according to the invention, that the container be constructed as a trough rotating about its vertical axis with a centrifugal wheel for the blasting means rotating about the same axis. By rotating the container about its vertical axis, the centrifugal force generated thereby is utilized to move the work pieces in a direction to the side wall of the container. There, the blasting agent is directed at high speed to the work pieces, so that their brittle burrs and projecting edges are knocked off.

Advantageous in this novel design, furthermore, is that the trough consists of a rotating bottom part and a fixed upper part. With this two-part construction of the trough or container, the path of movement of the work pieces to be deburred is such that the work pieces travel to the side wall and upwardly into a chamber bordered by a fixed upper trough section. Since no centrifugal force is any longer exercised on the work pieces in the fixed upper section, they then fall back to the bottom of the rotating lower trough section and are then moved again, comparatively as in a cycle, in the direction to the side wall of the trough.

According to the invention, the lower trough section has the shape of a horizontally arranged concave disk, which is rotatably arranged in a housing.

In a further development of the invention, an annular adjustable slot is provided between the two trough sections. The cast-off burr material and the blasting agent are conducted through this annular slot from the container into the housing and are fed to a separator.

For the removal of the mixture from the housing which consists of burr material and blasting agent, conveying plates are arranged at a bottom side of the rotating trough section facing the housing base.

BRIEF DESCRIPTION OF THE DRAWINGS

Novel features and advantages of the present invention in addition to those mentioned above will become apparent to those skilled in the art from a reading of the following detailed description in conjunction with the accompanying drawings wherein similar reference characters refer to similar parts and in which:

FIG. 2 is a top view of the device of FIG. 1.

DETAILED DESCRIPTION OF THE INVENTION

Figure 1:
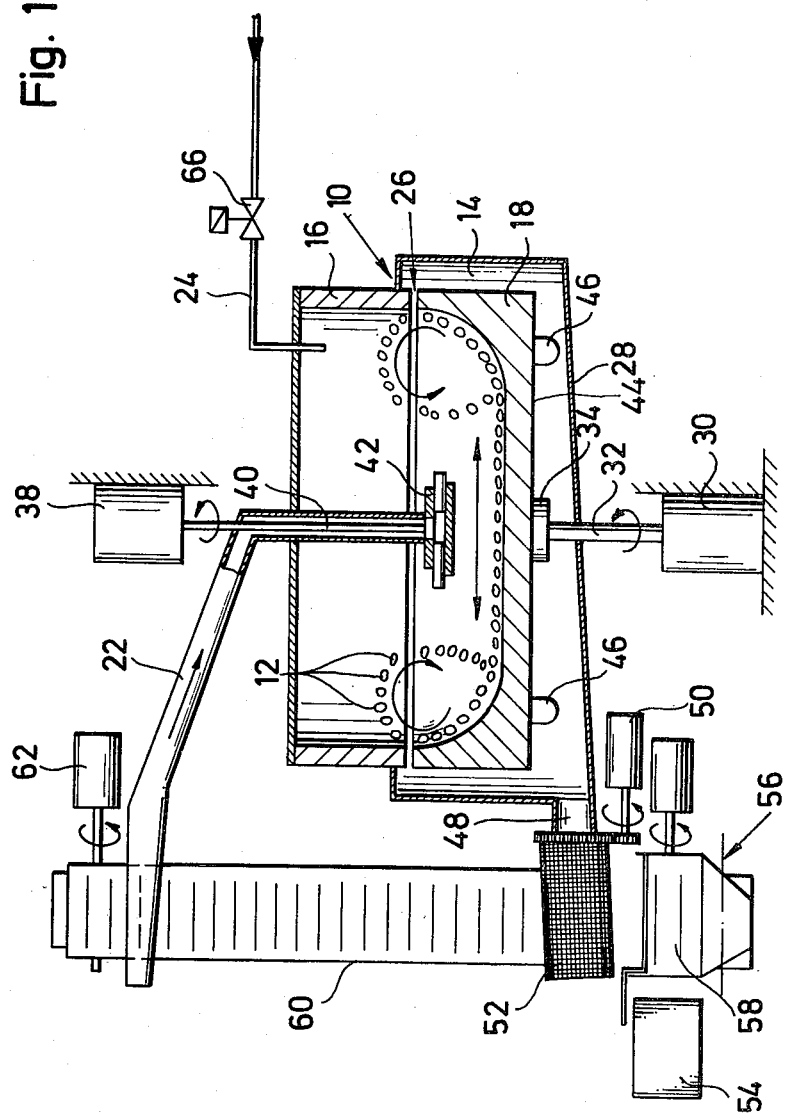
FIG. 1 is a schematic view of a deburring device, partially in section, according to the present invention.

As shown in the drawing, a container 10 for receiving the deburred work pieces 12 is partially surrounded by a housing 14. The work pieces 12 consist of rubber or similar items. Container 10 has the shape of a trough and consists of an upper fixed section 16 and a bottom rotating section 18. The section 18 is surrounded by the housing 14. The upper trough section 16 is ring shaped and is topped by a cover 20. A vertically arranged conduit 22 is preferably passed through the center of cover 20, and the blasting agent, e.g. steel shot, is conveyed into the interior of container 10, as described more fully below.

Additionally, a conduit 24 is provided, and the conduit 24 passes through the cover 22 for spraying a low-temperature medium, e.g. liquid nitrogen or liquid carbonic acid, into container 10.

As shown in FIG. 1, the bottom trough section 18 rotates about its vertical axis and has the shape of a concave disk. An adjustable annular slot 26 is provided between the fixed ring-shaped trough section 16 and the bottom section 14. Below base 28 of housing 14, a motor 30 is provided having a drive shaft 32 connected to the trough section 18 by a flange 34 so that the trough section 18 rotates.

Above lid 20 a second motor 38 is provided having a drive shaft 40. As shown in FIG. 1, the drive shaft 40 penetrates the vertical section of conduit 22 and terminates in the chamber formed by the bottom trough section 18. A centrifugal wheel 42 is fixed to the end of shaft 40 for directing the blasting agent toward the sides of trough section 18.

One or several conveying plates 46 are located at the base part 44 of the trough section 18 facing the housing base 28. These conveying plates move the mixture of burr material and blasting agent that falls from the annular slot 26 into housing 14. This mixture is conveyed in the direction of an outlet channel 48. The outlet channel 48 ends in a filter drum 52, activated by a motor 50, from which the coarse burr material reaches a container 54 and the blasting agent (steel shot) together with a portion of fine burr material reaches a wind tunnel 56. In the wind tunnel, the fine burr material is separated from the steel shot by a blower 58 operated by a motor and is filtered off by a material filter.

A bucket conveyor 60 adjacent the wind tunnel 56 transports the purified steel shot upwardly to the conduit 22 through which it is recycled to the centrifugal wheel 42. Activation of the bucket conveyor is accomplished by a motor 62.

Operation of the device is as follows. The work pieces 12 to be deburred are charged into container 10 through an opening 64 in cover 20, as illustrated in FIG. 2. Through rotation of the bottom trough section 18, the work pieces are moved in a direction toward the side wall of the trough section 18 and from there upwardly into the chamber enclosed by the ring-shaped trough section 16. Then they fall back again to the bottom of the lower trough section. At the same time, the work pieces 12 are sprayed with coolant, under temperature regulation, through conduit 24 so that they become brittle. When the pieces become sufficiently brittle, the steel shot is centrifuged against the work pieces 12 by the centrifuge wheel 42, preferably with a not-closed coolant conduit 24. The protruding burrs, edges, and the like, which are thinner in comparison to the remaining work piece and therefore more brittle than the work piece, are quickly and cleanly struck off. The striking off or separation of the burrs is intensified by the falling of the work pieces 12 from the chamber of the upper trough section 16 to the bottom of the rotating trough section 18. During the entire brittling procedure, a temperature is maintained in the container which assures a lasting brittlement of the work pieces.

The temperature in container 10 sealed by lid 20, is adjusted to a constant value by a magnetic valve 66 arranged in the coolant conduit 24 and by a regulator (not shown).

The separated burr material together with the steel shot is flung through the annular slot 26 from container 10 into the housing 14 and is collected at the bottom of housing 28. From there, the burr material and steel shot mixture is conducted into the filter drum 52 by the conveying plates 46. There, the first separation occurs, which is followed by a further separation in the wind tunnel 56. The purified steel shot is then recycled to the centrifuge wheel 42 via the bucket conveyor 60 and conduit 22.

The device operates at temperatures below 0°C. so that it relates to the freezing of water vapor from the surrounding atmosphere. However, this may lead, among other things, to a freezing together of fine steel shot (0.5 mm) and to a great coolant consumption. In order to avoid this, the entire device is arranged in a water-vapor-tight, cold-insulating housing, and is kept at an inside temperature of about —25°C. by means of a refrigeration plant with an evaporator. This housing with a refrigeration unit is not illustrated in the drawing for the sake of simplicity.

We claim:

1. A device for deburring work pieces of rubber or similar material comprising an essentially closed container for receiving the work pieces, supplies of a low-temperature medium and a blasting agent and conduit means for introducing them into the container, the container including a bottom trough section rotatable about its vertical axis and a fixed upper section forming a vertical extension of the bottom trough section, means for rotating the bottom trough section, a centrifugal wheel in the container associated with the conduit means for the blasting agent for introducing the blasting agent into the container, and means for rotating the centrifugal wheel.

2. A device as in claim 1 wherein the bottom trough section has the shape of a horizontally arranged concave disk, and a housing surrounding the bottom trough section.

3. A device as in claim 2 including an adjustable annular slot between the bottom trough section and the upper fixed section opening into the housing that surrounds the bottom trough section.

4. A device as in claim 3 including conveying plates secured to the underside of the bottom trough section between that section and the bottom of the housing.

* * * * *